Dec. 3, 1968  E. M. ADAMS  3,413,770
REVEAL MOLDING INSTALLATION AND CLIP
Filed Dec. 19, 1966
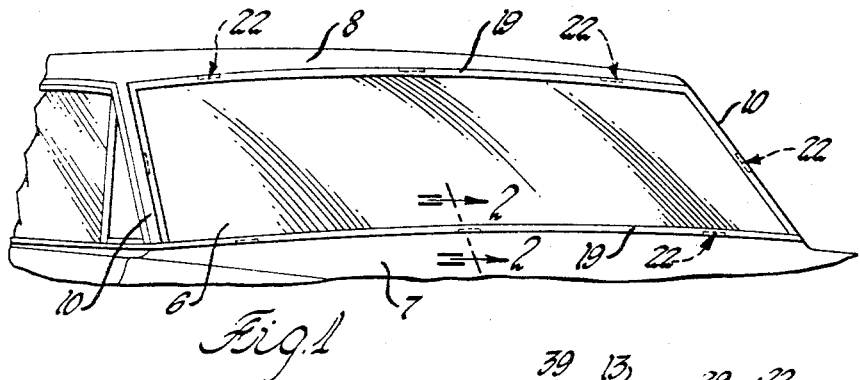
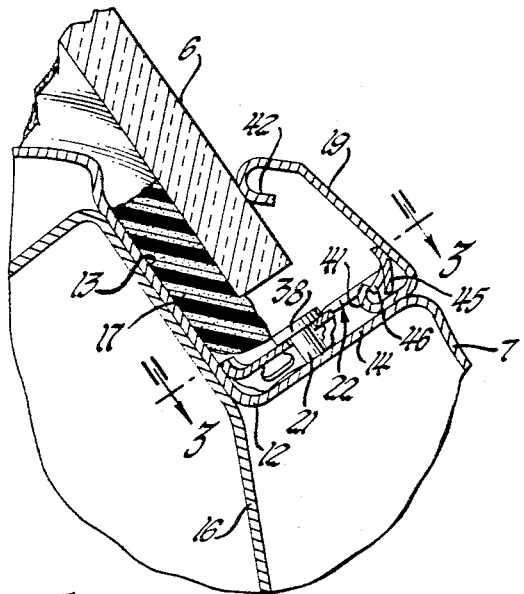
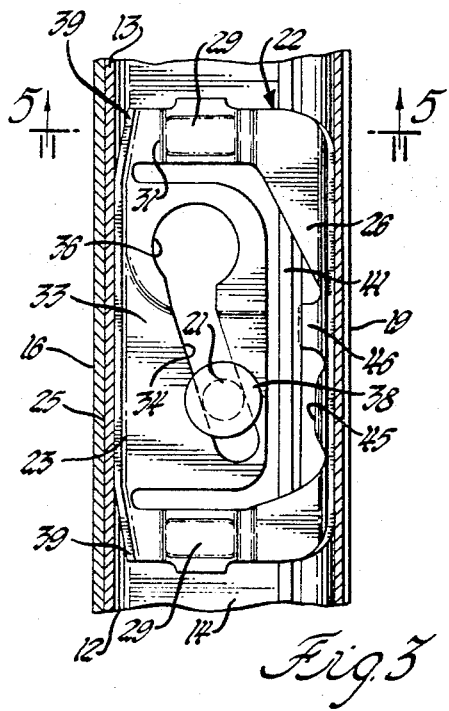
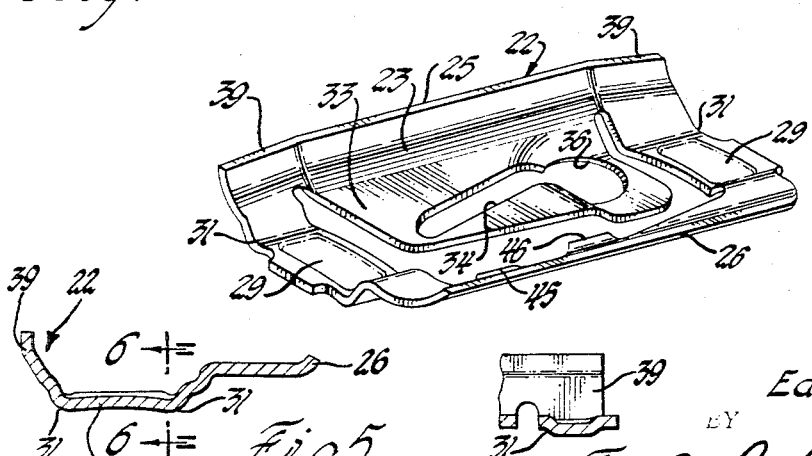
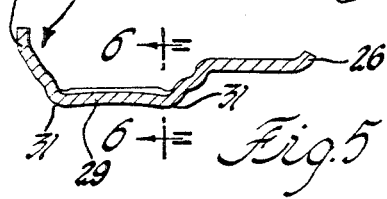
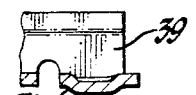
INVENTOR.
Edwin M. Adams
BY Paul Fitzpatrick
ATTORNEY 3,413,770
Patented Dec. 3, 1968

3,413,770
REVEAL MOLDING INSTALLATION AND CLIP
Edwin M. Adams, Mount Clemens, Mich., assignor to General Motors Corporation, Detroit, Mich., a corporation of Delaware
Filed Dec. 19, 1966, Ser. No. 602,808
8 Claims. (Cl. 52—208)

ABSTRACT OF THE DISCLOSURE

A motor vehicle windsield installation with a reveal molding clip inserted generally parallel to the pinchweld flange and wedged between the flange and a retaining stud, thus being located by the flange. Two tabs selectively engageable with the reveal molding accommodate variations in dimensions of the vehicle body.

---

My invention may be regarded as relating to improvements in the installation of panels such, for example, as automobile windshields, and also as relating to improvements in molding clips, particularly a clip of improved character for retention of a reveal molding for a windshield or similar installation.

By way of general technical background, it is usual for automobile windshields to be mounted in a frame which encircles the windshield and which, as viewed from outside the vehicle, has a generally angle iron configuration with the windshield seated against the back face of the angle, this face being commonly called the pinchweld. Suitable retaining and sealing means mount the windshield in the frame and an ornamental molding around the edge of the windshield, called a reveal molding, is put in place to conceal the edges of the glass and the seal.

It has been general practice to install the reveal molding by clips which lodge on and are located by headed studs welded to the windshield frame. These clips have been located by the studs, with the result that inaccuracies in welding the studs to the frame have adversely affected the alignment of the clips and thus their conformity to the desired plane of the reveal molding. According to my invention, the molding clips are of a character to be located by the pinchweld and, in fact, are configured to wedge between the stud and the pinchweld, thus being more prescisely located and aligned. A feature of the clips also is the provision of two relatively displaced fingers or tabs which couple selectively to the reveal molding top rovide further means of accommodation to possible distortions in structure of the vehicle body.

The objects of the invention are to improve automobile bodies and particularly windshield and other panel installations, to facilitate the assembly of motor vehicles, to provide an improved molding clip, and to provide a clip aiding more precise location of a reveal molding or the like.

The nature of the invention and its advantages will be cear to those skilled in the art from the succeeding detailed description and accompanying drawings of the preferred embodiment of the invention.

Referring to the drawings, FIGURE 1 is an axonometric view of an automobile windshield installation.

FIGURE 2 is a partial sectional view taken on the plane indicated by the line 2—2 in FIGURE 1;

FIGURE 3 is a fragmentary sectional view taken on the plane indicated by the line 3—3 in FIGURE 2;

FIGURE 4 is an axonometric view of the clip;

FIGURE 5 is a detail sectional view taken on the plane indicated by the line 5—5 in FIGURE 3;

FIGURE 6 is a detail sectional view taken on the plane indicated by the line 6—6 in FIGURE 5.

Referring first to FIGURE 1, a windshield 6 is shown disposed above the cowl 7 and below the top 8 of a vehicle and between pillars 10 at each side. These define a frame 12 extending around the margin of the windshield which, as shown in FIGURE 2, is of an L-shaped or angle iron configuration. One leg 13 of the L defines a face generally parallel to the windshield glass 6, and the other leg 14 defines a surface extending around the margin of the glass. The frame 12 is backed by a further sheet metal portion 16 of the body structure which is fixed to the leg 13 by a row of welds, the leg 13 therefore being referred to as the pinchweld flange. Suitable rubbery or plastic mounting means 17 is disposed around the margin of the glass between the glass and the frame. It may be an elastomeric molding or a suitably applied caulking material. It serves to seal against leakage between the glass and frame and to cushion the glass within the frame.

The mounting means 17 ordinarily is concealed by an ornamental, generally rectangular ring 19 called a reveal molding. As shown in FIGURE 2, the reveal molding is of generally channel cross section. It is dimensioned to fit within the leg 14 of the frame, to overlie the mounting means 17, and to have its inner margin bear against the glass.

Concealed means for retaining the reveal molding may comprise clips mounted on studs 21 extending toward the edge of the glass from the frame leg 14. Such studs are welded to the body sheet metal at points spaced around the frame 12.

The structure so far described may be regarded as conventional, my invention being embodied in the improved installation involving my clip 22, one of which mounts on each stud 21 and each of which couples to the reveal molding. The clip 22 comprises a generally rectangular frame or peripheral portion including an upturned rear flange 23 defining a straight edge portion 25 adapted to bear against the pinchweld. The frame also includes a forward edge portion 26 and two bridge portions 29 connecting the rear flange 25 to the forward edge portion 26. The bridge portions 29 are beaded or deformed as shown in FIGURES 5 and 6 to provide for rounded slightly projecting feet 31 which bear against the leg 14 when the clip is installed. Flange 25 and the part of the clip bearing feet 31 may be regarded as the base of the clip. The clip also includes a spring portion or tab 33 extending from the flange 23 almost to the forward edge portion 26. The portion 33 is punched to define a keyhole slot 34 having an enlarged entrance 36 which may be dropped over the head 38 of the stud 21. The slot 34 makes a wedging angle; that is, an angle less than the angle of repose, with edge 25. Therefore, when the clip is dropped over the stud and pushed upwardly as viewed in FIGURE 3, the clip is wedged between the stud and the pinchweld flange 13. A suitable angle is about 10° and, with a clip of suitable proportions for this type of installation, a variance of about 0.05 inch in the spacing of stud 21 from the pinchweld can be accommodated by wedging of the stud at various points along the keyhole slot. It will be noted that the spring portion 33 is deformed so that the end thereof around the keyhole slot entrance end 36 is relatively closely adjacent the surface 14, whereas the remainder of the spring portion is adapted to bear resiliently against the head of the stud and thus hold the base of the slip against the surface 14. Preferably, the flange 25 is deformed to provide ramp ends 39 on the edge 25 so that the clips can slide on the pinchweld flange more easily in installation and for removal.

Once the clips 22 and the glass 6 with its mounting means 17 are in place, the generally rectangular reveal molding 19 is pressed into place. This molding has a lower recurved flange 41 and an upper recurved flange 42. The lower flange 41 can slide between the clip 22 and the surface 14, in so doing deflecting the bridge portions 29 which spring partly back after the molding is in place. These bridge portions constitute cantilever springs connecting the base of the clip to two tabs 45 and 46 which extend downwardly and rearwardly from the portion 26, but are of different proportions so that the tab 46 is slightly closer to the pinchweld than the tab 45. As illustrated in FIGURE 2, the reveal molding is caught behind the second or inner tab 46. However, if the molding is sufficiently close to the pinchweld when it has been sprung under the first tab 45, it may be so retained. This feature of the presence of two tabs provides additional flexibility in the mounting of the molding.

The detailed description of the preferred embodiment of the invention for the purpose of explaining the principles thereof is not to be considered as limiting or restricting the invention, since many modifications may be made by the exercise of skill in the art.

I claim:

1. A molding clip adapted to be mounted within an angle iron frame, the clip comprising a peripheral portion adapted to bear against one leg of the angle iron and having one edge adapted to bear against the other leg of the angle iron, a spring portion extending from the peripheral portion, resiliently deflectable toward the said one leg, the spring portion defining a slot extending at a wedging angle to the said edge adapted to receive a headed stud extending from the said one leg, and means on the clip adapted to engage a molding and secure the molding to the angle iron, in which the peripheral portion includes a base adapted to bear against the said one leg under the effect of a bias exerted by the spring portion when it bears against the head of the stud and includes cantilever spring means extending from the base bearing the said molding engaging means.

2. A clip as recited in claim 1 in which at least one end of the said edge has a ramp configuration.

3. A clip as recited in claim 1 in which the base bears projections extending therefrom adapted to bear directly against the said one leg.

4. A clip as recited in claim 1 in which the slot is substantially rectilinear and is disposed at an angle of approximately ten degrees to the said edge.

5. A windshield installation or the like comprising, in combination, a sheet, a fixed frame of L-shaped cross-section extending around the margins of the sheet, one leg of the L defining a face generally parallel to the sheet and the second leg defining a surface generally perpendicular to the sheet and overlying the margin of the sheet, mounting means disposed between the sheet and frame, a trim molding extending along the margin of the sheet mounted on the frame, and means securing the molding to the frame, the said means including headed studs extending from the said frame surface and molding clips connecting the molding to the studs, wherein the improvement comprises a molding clip including a base bearing against the said surface of the second leg and two spring portions extending from the base, the first one of the spring portions being configured to define a slot receiving the stud, the slot extending at a wedging angle to the said face when the clip is in place, with the stud entrance end of the slot nearest the said face, the clip having an edge disposed against the said face so that the clip is wedgingly engaged between the face and the stud, the first spring portion bearing against the head of the stud and pressing the base resiliently against the said surface, the second spring portion bearing means coupling to the molding, the coupling means being at a fixed distance from the said edge so that its distance from the said face is fixed notwithstanding latitude in the spacing of the studs from the said face.

6. An installation as recited in claim 5 in which the base includes feet extending from the base and bearing directly against the second leg.

7. An installation as recited in claim 5 in which the sheet is a windshield and the molding is a reveal molding.

8. An installation as recited in claim 5 in which the slot is a keyhole slot.

References Cited

UNITED STATES PATENTS

| | | | |
|---|---|---|---|
| 906,218 | 12/1908 | Goddard | 52—717 |
| 1,688,953 | 10/1928 | Yeager | 52—476 |
| 3,103,265 | 9/1963 | Meyer | 52—718 |
| 3,239,988 | 3/1966 | Meyer | 52—718 |
| 3,241,277 | 3/1966 | Coppock | 52—208 |
| 3,307,294 | 3/1967 | Bienenfeld et al. | 52—502 X |
| 3,354,597 | 11/1967 | Meyer | 52—718 |

HENRY C. SUTHERLAND, *Primary Examiner.*

ALFRED C. PERHAM, *Assistant Examiner.*